(No Model.) 2 Sheets—Sheet 1.
O. B. JACOBS.
BALL BEARING.
No. 509,739. Patented Nov. 28, 1893.
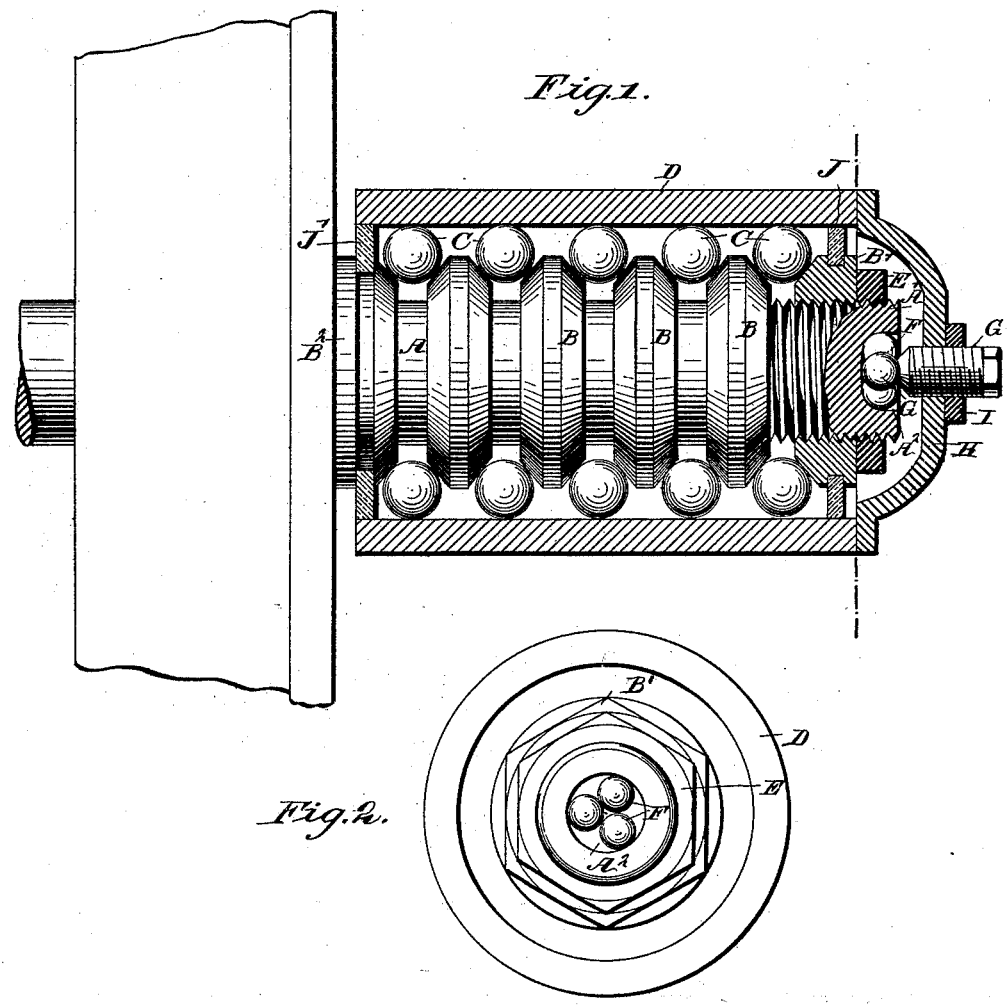
WITNESSES:
John A. Rennie
C. Sedgwick
INVENTOR
O. B. Jacobs
BY
Munn & Co
ATTORNEYS.

(No Model.) 2 Sheets—Sheet 2.

O. B. JACOBS.
BALL BEARING.

No. 509,739. Patented Nov. 28, 1893.

WITNESSES:
John A. Rennie
C. Sedgwick

INVENTOR
O. B. Jacobs
BY
Munn & Co.
ATTORNEYS.

UNITED STATES PATENT OFFICE.

OLAUS B. JACOBS, OF FREMONT, WASHINGTON.

BALL-BEARING.

SPECIFICATION forming part of Letters Patent No. 509,739, dated November 28, 1893.

Application filed May 25, 1893. Serial No. 475,492. (No model.)

*To all whom it may concern:*

Be it known that I, OLAUS B. JACOBS, of Fremont, in the county of King and State of Washington, have invented a new and Improved Ball-Bearing, of which the following is a full, clear, and exact description.

The invention relates to journal bearings for general use, and its object is to provide a new and improved ball bearing, which is simple and durable in construction, very effective in operation, and arranged to reduce the friction and wear to a minimum.

The invention consists of sets of balls interposed between the periphery of the shaft or axle and the box, the sets of balls being separated from each other.

The invention also consists of certain parts and details and combinations of the same, as will be fully described hereinafter and then pointed out in the claim.

Reference is to be had to the accompanying drawings forming a part of this specification, in which similar letters of reference indicate corresponding parts in all the figures.

Figure 3:
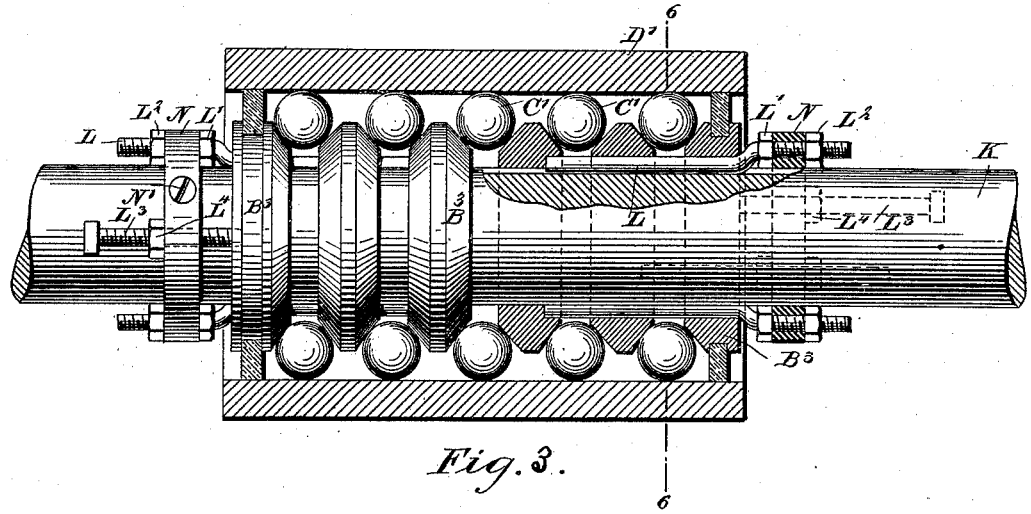
Figure 4:
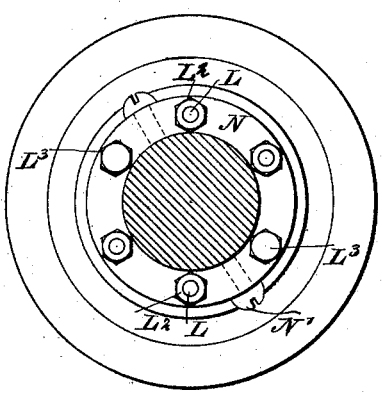
Figure 5:
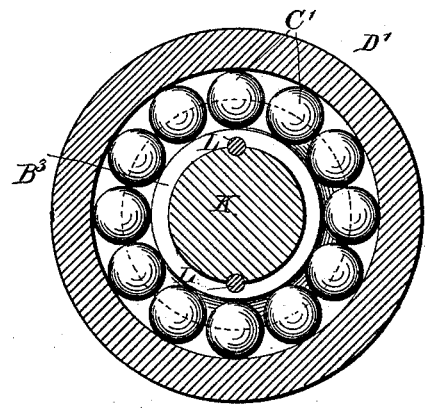
Figure 6:
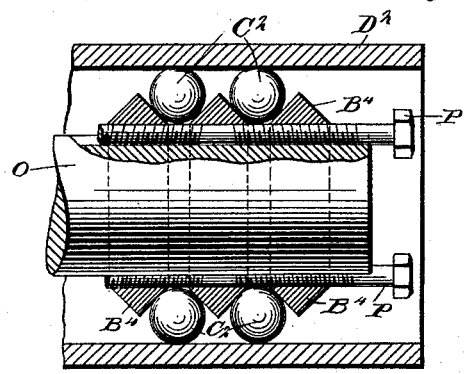

Figure 1 is a side elevation of the improvement with parts in section and arranged on a car axle. Fig. 2 is an end view of the same with the cap of the box removed. Fig. 3 is a sectional side elevation of a modified form of the improvement, with parts broken out. Fig. 4 is an end elevation of the same. Fig. 5 is a cross section of the same on the line 6—6 of Fig. 3; and Fig. 6 is a sectional side elevation of another modified form of the improvement.

As illustrated in Figs. 1 and 2, the ball bearing is applied on a car axle A, on which are mounted loosely a series of rings B having beveled sides and placed suitable distances apart, so that the beveled sides of two adjacent rings are adapted to receive a set of balls C in frictional contact on their outer sides with the inner surface of the journal box D into which extends the axle A. Any desired number of such sets of balls with corresponding rings B may be employed, according to the length of the axle, the outermost ring B′ being preferably formed in the shape of a nut screwing on the threaded end A′ of the axle A, so as to permit of adjusting this ring B′ lengthwise on the axle to adjust the other rings in the series, and also the series of balls C supported on the rings and holding the latter spaced or separated from the fixed box. Thus, for instance, if the rings and balls, as well as the inner surface of the box D have become worn, wear can be taken up by moving the nut ring B′ inward until a comparatively tight fit is again established between the rings, balls and box.

In order to lock the outermost nut ring B′ in place, I provide a jam nut E, also screwing on the threaded end A′ of the axle A. In order to take up end thrust of the axle A, I provide or form in the end of the said axle, a recess $A^2$, containing a series of balls F, engaged at their middle by the pointed end of a screw G screwing in the cap H attached to the outer end of the journal box D. A jam nut I serves to lock the screw G in place. This end thrust device is more fully shown and described in the application for Letters Patent, Serial No. 454,387, filed by me under date of December 7, 1892, and allowed February 27, 1893.

In the end rings B′ and $B^2$ are formed annular recesses engaged by flexible washers J and J′ respectively, fitting with their peripheral surface on the inner surface of the box D, so as to close the ends thereof and render the same dust-proof.

I do not limit myself to any particular means for adjusting the balls in the bearings so as to take up any wear, as various other forms may be employed to accomplish this purpose. For instance, as shown in Fig. 3, the shaft K supporting the rings $B^3$ is provided with longitudinal key-ways, each engaged by a rod or key L, also fitting into a key-way formed in the rings $B^3$, the outer end of each rod L being fitted in a ring N secured by a set screw N′ to the shaft K. Nuts L′ and $L^2$ screw on the outer threaded end of the rod L, to hold the latter in position in the ring N.

Now, it will be seen that by adjusting the ring N on the shaft K, or adjusting the rod L in the ring N by screwing the nuts L′ and $L^2$, the lateral shifting of the rings $B^3$ is accomplished, so that the series of balls C′ supported by the rings and engaging the inner surface of the box D′, shift accordingly, to take up all wear. The outermost rings $B^3$ of the series can be adjusted by set screws $L^3$, also screwing in the ring N and locked in place therein by jam nuts L⁴.

If desired the rings B⁴ supporting the series of balls C² within the box D², as illustrated in Fig. 6, may be shifted by means of threaded bolts P, mounted in key-ways in the shaft O and provided with right and left hand threads, as shown, to move two outermost rings toward each other against the middle ring, as will be readily understood by reference to the said Fig. 6. By this arrangement the wear is readily taken up between the rings, balls and box.

Having thus fully described my invention, I claim as new and desire to secure by Letters Patent—

A ball bearing comprising a fixed box, series of rings oppositely beveled at the peripheries, the opposed beveled surfaces of adjacent rings forming V-shaped annular recesses, and series of balls in said recesses, the balls projecting beyond the rings and spacing them from the fixed box, the rings being adjustable and the movement of the same toward each other serving to press the balls outward into direct contact with the box, substantially as described.

OLAUS B. JACOBS.

Witnesses:
WILLIAM MURPHY,
C. E. REMSBERG.